Aug. 1, 1961   J. R. WILSON   2,994,338
FLUID CONTROL APPARATUS
Filed May 22, 1957

INVENTOR
JOSEPH R. WILSON
BY Robert T. French
ATTORNEY

United States Patent Office 2,994,338
Patented Aug. 1, 1961

2,994,338
FLUID CONTROL APPARATUS
Joseph R. Wilson, Merriam, Kans., assignor to Westinghouse Electric Corporation, East Pittsburgh, Pa., a corporation of Pennsylvania
Filed May 22, 1957, Ser. No. 660,875
3 Claims. (Cl. 137—340)

This invention relates to valves, more particularly to valves for controlling the flow of fluids, and has for an object to provide improved leak-proof valves of this type.

In many fluid utilizing installations it is essential that the valves be substantially leak-proof when in the closed position to prevent loss of fluid, reduction in pressure within the system, etc. This is especially an essential requirement in systems involving the circulating of high temperature heat transfer fluid. Loss of such fluid to the ambient atmosphere presents a serious hazard.

The heat transfer medium employed in some systems may be highly heated metal in a molten or liquid state. Valves for controlling such fluids are generally provided with metallic valve members and valve seats to withstand the high temperatures. Such valves, especially drain and fill valves which are operated at infrequent intervals, are often self-welded in the closed position. Self-welding of mating parts occurs when they are tightly-held together at high temperature in the presence of liquid metal which acts as a flux or cleaning agent. Large forces are required to subsequently actuate a valve which has been self-welded by the above phenomenon.

In view of the above, it is a further object of the invention to provide an improved valve of the above type which is readily movable between open and closed positions, yet completely obviates leakage of fluid when in the closed position.

Another object is to provide a valve of the above type which may be safely and expeditiously opened even though self-welded by diffusion of molten metal and which, when in the closed position, provides a seal which is mass spectrometer tight, i.e., so tight that the leakage, if any, cannot even be detected by a mass spectrometer.

Briefly, according to the invention there is provided a valve mechanism having a housing or body member providing a fluid passageway and having a valve port defined by a metallic wall portion of the body. The valve port preferably is of circular cross-sectional shape and disposed in communication with the passageway. A movable metallic valve member is further provided having an elongated stem slidably received in the valve body and having an enlarged head portion of circular cross-sectional shape at one end for blocking and unblocking the valve port. Preferably, though not essentially, the wall portion defining the port and the head portion of the valve member are formed of metals having substantially similar coefficients of thermal expansion.

The head portion of the valve member is a few thousandths of an inch larger in diameter than the diameter of the valve port for all temperature conditions uniformly affecting the body and valve member. One of the body member and valve member is provided with heat exchange structure for circulating a fluid at a different temperature to thermally modify the one member and render the diameters of the valve port and valve head portion temporarily equal. During such equalization, the valve member is moved toward the valve port to slidably insert the head portion in the valve port. Subsequently, the fluid flow through the heat exchange structure is terminated and, as the two members assume the same temperature value, the original difference in diameters is reestablished to tightly secure the head portion in the valve port. The interference fit thus attained is so tight that a complete seal is attained, obviating even the most minute leakage therethrough.

When it is desired to reopen the valve mechanism, fluid is again circulated through the heat exchange structure to provide adequate temperature differential to relieve the interference fit and free the valve head portion from the valve port. Thereafter the valve member is retracted to move the valve head portion out of its blocking position in the valve port.

In the embodiment illustrated and subsequently to be described in detail, the heat exchange structure is provided in the movable valve member. Accordingly, by circulating a coolant fluid therethrough the diameter of the head portion is reduced to permit its insertion or withdrawal from the valve port.

The foregoing and other objects are effected by the invention as will be apparent from the following description and claims taken in connection with the accompanying drawings, forming a part of this application, in which:

Figure 1:
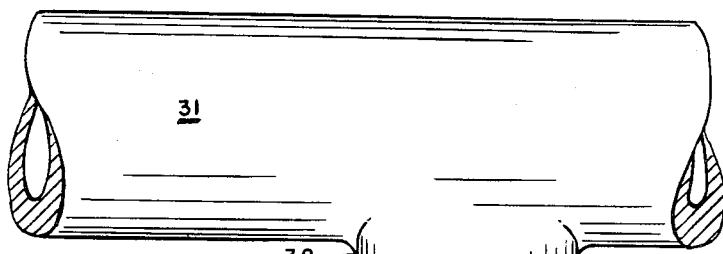
FIG. 1 is an axial sectional view of a valve mechanism incorporating the invention.

Referring to the drawing in detail, there is shown a valve mechanism 10 having a metallic housing or body member 11 of generally T-shape and defining an L-shaped fluid passageway 12 communicating with a fluid inlet opening 13 and a fluid outlet opening 14. Intermediate the inlet and outlet openings 13 and 14, a portion of the wall defining the passageway 12 is restricted in a manner to provide a valve port 15 of preferably circular circumscribed area.

The valve mechanism is further provided with a movable metallic valve member 16 having an elongated tubular stem 17 slidably received in the valve body 11 and having an enlarged head portion 18 adapted to be received in the valve port 15, as shown in FIG. 1, to provide a metal-to-metal seal blocking fluid flow through the passageway 12. The head portion 18 is hollow and the chamber 19 formed therein communicates with the interior passageway 20 defined by the stem 17. A tube 21 of smaller diameter than the stem 17 is axially mounted therewithin with its open upper end extending into the chamber 19 and attached at its lower end to the lower end wall 22 of the stem 17 in a rigid and fluid-tight manner. The tube 21 is connected to a flexible conduit 23 while the passageway 20 in the stem is connected to a flexible conduit 24. The conduits 23 and 24 are connected to a suitable supply of coolant fluid (not shown).

The valve mechanism, in the embodiment shown, is of the hydraulically actuated servo type. Accordingly, the valve body 11 is provided with a cylindrical bore 25 and the valve stem 17 is provided with a circular land 26 slidably received within the bore 25 and axially movable therein. The land 26, together with the bore 25, defines an upper chamber 27 and a lower chamber 28. A fluid conduit 29 is connected to the upper chamber 27 and a similar conduit 30 is connected to the lower chamber 28. The two conduits 29 and 30 are employed as supply and return conduits for delivering and returning hydraulic fluid to a suitable source of supply (not shown).

Figure 3:
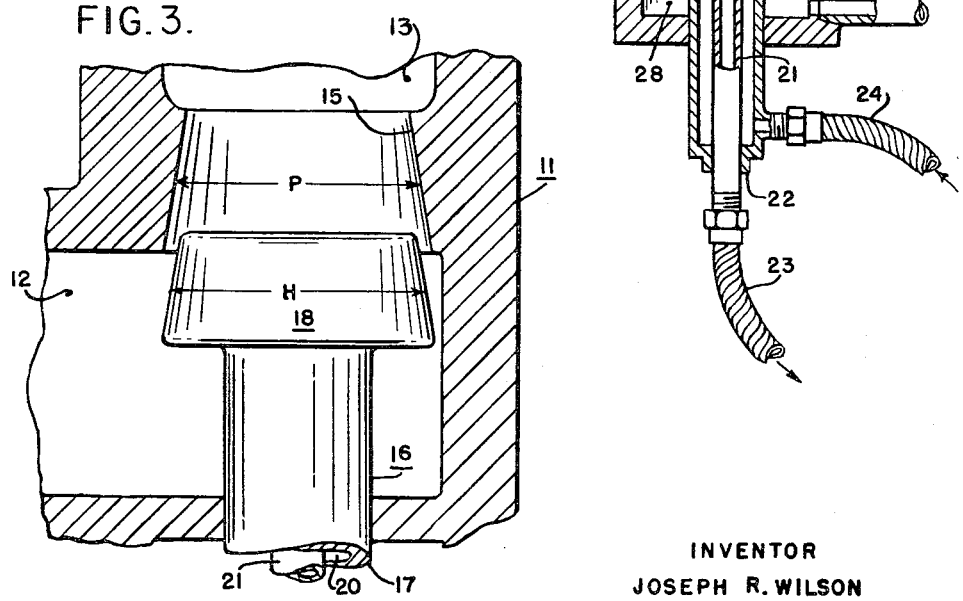
FIG. 3 is a fragmentary view of the valve mechanism, on a larger scale, illustrating the valve in an intermediate position.

The valve head portion 18, as shown in FIG. 3, is formed with a larger mean diameter H than the mean diameter P of the valve port 15 so that the head portion 18 cannot be readily inserted in the valve port 15 when the valve body 11 and the movable valve member 16 are at the same ambient temperatures. Although the exact difference in the mean diameter of the head 18 above that of the valve port 15 is not critical, the head portion 18 is formed with its mean diameter H on the order of .002 to .004 of an inch larger than the valve port.

When it is desired to close the valve mechanism, fluid at a substantially lower temperature than that of the ambient is admitted through the conduit 24 into the stem passageway 20, whereupon it flows upwardly into the chamber 19 of the valve head to cool and shrink the valve head 18 and thence is directed through the tube 21 to the return conduit 23 and back to the supply source (not shown). After a short interval of time of cooling in the above manner, the diameter H of the valve head 18 is reduced an amount greater than the heretofore mentioned differential in diameters (.002–.004 inch) or at least an amount sufficient to make the two diameters equal. The valve member 17 may then be axially translated upwardly to slidably insert the valve head member in the valve port 15. This movement is attained by admitting pressurized hydraulic fluid through conduit 30 into the chamber 28 to force the land 26 upwardly in the bore 25 and concomitantly draining the hydraulic fluid from chamber 27 through conduit 29. After the valve head 18 is fully seated, the flow of coolant fluid through the valve member 17 is terminated. As the valve head 18 returns to ambient temperature, the differential temperature between valve head and the valve body 11 is reduced to zero with resultant enlargement of the diameter of the valve head to its original dimensions. The interference fit thus attained (.002 to .004 of an inch) is sufficient to provide such intimate contact between the port and valve head that the resulting seal prevents even minute fluid flow therepast.

When it is desired to reopen the valve mechanism, the above cooling procedure is repeated to shrink the valve head 18 and cause the diameter thereof to be reduced sufficiently to free the valve head from the valve port 15. The valve member 17 may then be moved downwardly to open the valve port 15. Such movement is effected by admission of hydraulic fluid through the conduit 29 into the upper chamber 27 and concomitantly draining the hydraulic fluid from the lower chamber 28 through conduit 30, thereby urging the land 26 in downward direction.

Figure 2:
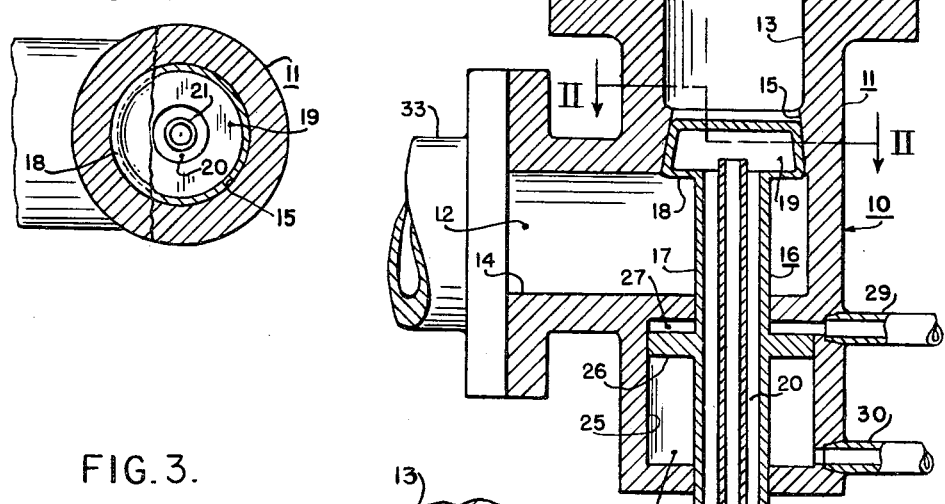
FIG. 2 is a transverse section taken on line II—II of FIG. 1.

The valve head 18 and the mating valve port 15 may be substantially cylindrical in shape, but are preferably formed in the manner shown in FIGS. 1 and 2, with a slight taper or angle of convergence to impart a frusto-conical shape thereto. With this arrangement, when the valve head 18 is moved into or out of engagement with the valve port 15, galling is eliminated. The angle of convergence is relatively small. For example, it may be on the order of one to two degrees.

The valve mechanism 10 heretofore described may be utilized for numerous applications, as well known in the art. However, in the example illustrated, it is of the type known as a drain and fill valve. Accordingly, it has been illustrated in conjunction with a header pipe 31 having a tap outlet 32 flanged in a manner to permit fluid-tight attachment to an associated flange at the inlet 13 of the valve mechanism. In a similar manner, the fluid outlet 14 of the valve mechanism is attached in a fluid-tight manner to a flanged conduit 33.

When the valve mechanism is utilized in the application shown in FIG. 1, it is operated at highly infrequent intervals to permit draining and/or refilling the fluid in the header 31.

The header 31 may, for example, be employed to conduct heat transfer fluid in conjunction with a system utilizing highly heated liquid in a molten state, such as sodium, etc. As well known in the metallurgical art, when highly heated liquid, metal lies in contact with closely fitting metallic surfaces such as the walls defining the valve port 15 and the valve head 18, a self-welding effect is attained due to the fluxing of cleansing effect of the liquid metal. Hence, when it is desired to open the valve mechanism 10, large forces are necessary to break the seal. However, with the invention actuation of the valve member 17 is readily effected even after subjection to the above self-welding phenomenon. In view of the above, it will now be apparent that the invention provides a valve mechanism which is highly advantageous for use with apparatus as previously described.

Also, since the fluid in the header 31 is objectionable, any leakage to atmosphere must be avoided. The valve mechanism 10 attains the high degree of sealing required by providing a seal which is termed mass spectrometer tight, i.e., the leakage of fluid therepast is insufficient to be detected by a highly sensitive mass spectrometer.

It will now be seen that the invention provides a valve mechanism which effects an absolute fluid-tight seal under even the most severe conditons of use and in which the valve member 17 is readily movable even though welded to the port 15 by the hot liquid metal confided thereby.

While the invention has been shown in but one form, it will be obvious to those skilled in the art that it is not so limited, but is susceptible of various changes and modifications without departing from the spirit thereof.

What is claimed is:

1. A valve mechanism comprising a body having a fluid flow passageway, a fluid inlet and a fluid outlet communicating with said passageway, and a circular valve seat circumscribed by a wall portion of said body, said valve seat communicating with said passageway intermediately of said inlet and outlet; a valve member having a stem portion slidably received in said body for axial translation therein, said valve member having an enlarged seating portion of generally circular cross sectional shape disposed in axial alignment with said valve seat, said seating portion being of larger area than the corresponding area of said valve seat during conditions in which said wall portion and said seating portion are at a substantially uniform temperature; means for delivering a fluid to said seating portion at a different temperature to selectively render the area of said valve seat and said seating portion substantially equal to allow engagement and disengagement of said valve seat and said seating portion; and means for moving said valve member toward said valve seat a distance sufficient to effect insertion of said seating portion into said valve seat when said areas are substantially equal.

2. A valve mechanism comprising a body having a fluid flow passageway therethrough, a valve port having a seating portion which defines a generally cylindrical surface and communicating with said passageway, a valve member having a hollow seating portion and being movable into and out of registry with said port to block and unblock the latter, said member seating portion being of substantially cylindrical contour and being shaped similarly with the shape of said valve port seating portion, means for selectively circulating a heat exchanging fluid through said hollow portion in order to change the area of said valve member seating portion relative to said valve port seating portion, the surfaces of each of said seating portions being tapered outwardly in the direction of withdrawal of said valve member seating portion from said valve port seating portion in order to prevent galling, and means for moving said valve member relative to said valve port.

3. A valve mechanism comprising a body having a fluid flow passageway therethrough, means defining a valve port having a seating portion and communicating with said passageway, a valve member having a seating portion slidably receivable in said valve port seating portion to block the latter, said valve member seating portion and said valve port seating portion being of similar shape, said valve member portion being of larger area than the corresponding area of said valve port seating portion during temperature conditions uniformly affecting the valve port defining means and said valve member, said valve member portion having a chamber, conduit means communicating with said chamber for selectively delivering coolant fluid thereto, whereby the area of said valve member portion may be reduced to allow engagement and disengagement of the aforesaid seating portions, and means for moving said valve member relative to said valve port when the area of said valve member portion has been reduced.

References Cited in the file of this patent

UNITED STATES PATENTS

| | | |
|---|---|---|
| 1,953,611 | Jardine | Apr. 3, 1934 |
| 2,132,262 | Gabriel | Oct. 4, 1938 |
| 2,162,304 | Gross | June 13, 1939 |